United States Patent
Sarikaya

(10) Patent No.: US 9,461,868 B2
(45) Date of Patent: Oct. 4, 2016

(54) SYSTEM AND APPARATUS FOR ROUTER ADVERTISEMENT OPTIONS FOR CONFIGURING NETWORKS TO SUPPORT IPV6 TO IPV4 MULTICAST TRANSLATION

(71) Applicant: Futurewei Technologies, Inc., Plano, TX (US)

(72) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 699 days.

(21) Appl. No.: 13/866,867

(22) Filed: Apr. 19, 2013

(65) Prior Publication Data

US 2013/0279518 A1    Oct. 24, 2013

Related U.S. Application Data

(60) Provisional application No. 61/635,736, filed on Apr. 19, 2012.

(51) Int. Cl.
| | |
|---|---|
| *H04J 3/16* | (2006.01) |
| *H04L 29/06* | (2006.01) |
| *H04L 12/56* | (2006.01) |
| *H04L 12/721* | (2013.01) |

(52) U.S. Cl.
CPC ......... *H04L 29/06068* (2013.01); *H04L 45/72* (2013.01); *H04L 45/741* (2013.01)

(58) Field of Classification Search
USPC .......... 370/312–338, 390–467; 709/208–245
See application file for complete search history.

(56) References Cited

U.S. PATENT DOCUMENTS

| | | | | |
|---|---|---|---|---|
| 6,038,233 A | * | 3/2000 | Hamamoto | ....... H04L 29/12009 370/401 |
| 6,708,219 B1 | * | 3/2004 | Borella | ............... H04L 12/4633 709/230 |
| 7,263,075 B2 | | 8/2007 | Roh et al. | |
| 7,542,458 B2 | | 6/2009 | Lioy et al. | |
| 7,577,141 B2 | * | 8/2009 | Kamata | ................... H04L 12/18 370/390 |
| 7,860,094 B2 | * | 12/2010 | Tsuchiya | ................. H04L 12/18 370/390 |
| 7,876,757 B2 | | 1/2011 | Jain et al. | |
| 7,894,433 B2 | | 2/2011 | Ribiere et al. | |
| 7,894,456 B2 | | 2/2011 | Koskelainen | |
| 8,054,839 B2 | | 11/2011 | Cha et al. | |
| 8,254,294 B2 | | 8/2012 | Vesterinen | |

(Continued)

OTHER PUBLICATIONS

Baker, F. J., "IPv6 Source/Destination Routing Using IS-IS," Network Working Group, Internet Draft, draft-baker-ipv6-isis-dst-src-routing-00, Feb. 17, 2013 11 pages.

(Continued)

*Primary Examiner* — Man Phan
(74) *Attorney, Agent, or Firm* — Conley Rose, P.C.; Grant Rodolph; Adam J. Stegge

(57) ABSTRACT

A network element (NE) comprising a processor configured to cause the NE to act as a default router for an Internet Group Management Protocol (IGMP) to Multicast Listener Discovery (MLD) translation entity, and configure the IGMP to MLD translation entity with a multicast translation prefix by including the multicast translation prefix in a router advertisement (RA) message sent to the IGMP to MLD translation entity. Also disclosed is a method comprising configuring an IGMP to MLD translation entity by transmitting a RA message to the IGMP to MLD translation entity, wherein the RA message comprises at least one multicast translation prefix.

13 Claims, 4 Drawing Sheets

(56) References Cited

U.S. PATENT DOCUMENTS

| | | | |
|---|---|---|---|
| 8,539,053 | B2 | 9/2013 | Sarikaya et al. |
| 8,665,873 | B2* | 3/2014 | Sarikaya ........... H04L 29/12358 370/312 |
| 8,879,418 | B2 | 11/2014 | Yan et al. |
| 9,036,633 | B2* | 5/2015 | Sarikaya ............... H04L 12/184 370/390 |
| 2007/0008949 | A1 | 1/2007 | Balandin |
| 2011/0286470 | A1* | 11/2011 | Dec .................... H04L 12/1836 370/467 |
| 2012/0005299 | A1* | 1/2012 | Xu ................... H04L 29/12358 709/208 |
| 2012/0005372 | A1* | 1/2012 | Sarikaya ............... H04L 61/251 709/245 |
| 2012/0163164 | A1 | 6/2012 | Terry et al. |
| 2013/0007291 | A1* | 1/2013 | Nickols ............... H04L 65/1069 709/228 |
| 2014/0376470 | A1* | 12/2014 | Mahkonen .......... H04L 61/1511 370/329 |
| 2015/0222567 | A1* | 8/2015 | Sarikaya ............... H04L 12/184 370/390 |

OTHER PUBLICATIONS

Baker, F. J., "IPv6 Source/Destination Routing Using OSPFv3," Network Working Group, Internet Draft, draft-baker-ipv6-ospf-dst-src-routing-00, Feb. 17, 2013, 10 pages.

Boucadair, M., Ed., et al., "IPv6 Multicast Address With Embedded IPv4 Multicast Address," MBONED Working Group, Internet Draft, draft-ietf-mboned-64-multicast-address-format-04, Aug. 24, 2012, 14 pages.

Jiang, S., Ed., et al., "IPv4 Residual Deployment via IPv6—A Stateless Solution (4rd)," Internet Engineering Task Force, Internet Draft, draft-ietf-softwire-4rd-04, Oct. 22, 2012, 40 pages.

Troan, O., et al., "Mapping of Address and Port with Encapsulation (MAP)," Network Working Group, Internet Draft, draft-ietf-softwire-map-05, Mar. 18, 2013, 53 pages.

Li, X., et al., "Mapping of Address and Port Using Translation (MAP-T)," Network Working Group, Internet Draft, draft-ietf-softwire-map-t-01, Feb. 18, 2013, 33 pages.

Boucadair, M., et al., "DHCPv6 Option for IPv4-Embedded Multicast and Unicast IPv6 Prefixes," Softwire WG, Internet Draft, draft-ietf-softwire-multicast-prefix-option-00, Mar. 28, 2012, 9 pages.

Boucadair, M., et al., "DHCPv6 Option for IPv4-Embedded Multicast and Unicast IPv6 Prefixes," Softwire WG, Internet Draft, draft-ietf-softwire-multicast-prefix-option-03, Oct. 22, 2012, 9 pages.

Sarikaya, B., "IPv6 RA Options for Multiple Interface Next Hop Routes," Network Working Group, Internet Draft, draft-sarikaya-mif-6man-ra-route-03, Mar. 27, 2013, 13 pages.

Sarikaya, B., "IPv6 RA Options for Translation Multicast Prefixes," Network Working Group, Internet Draft, draft-sarikaya-softwire-6man-raoptions4mcast-02, Mar. 27, 2013, 13 pages.

Bradner, S., "Key Words for Use in RFCs to Indicate Requirement Levels," Network Working Group, RFC 2119, Mar. 1997, 3 pages.

Rose, M., "Writing I-Ds and RFCs Using XML," Network Working Group, RFC 2629, Jun. 1999, 32 pages.

Ferguson, P., et al., "Network Ingress Filtering: Defeating Denial of Service Attacks Which Employ IP Source Address Spoofing," Network Working Group, RFC 2827, May 2000, 10 pages.

Haberman, B., et al., "Unicast-Prefix-Based IPv6 Multicast Addresses," Network Working Group, RFC 3306, Aug. 2002, 8 pages.

Cain, B., et al., "Internet Group Management Protocol, Version 3," Network Working Group, RFC 3376, Oct. 2002, 54 pages.

Vida, R., Ed., et al., "Multicast Listener Discovery Version 2 (MLDv2) for IPv6," Network Working Group, RFC 3810, Jun. 2004, 63 pages.

Arkko, J., Ed., "SEcure Neighbor Discovery (SEND)," Network Working Group, RFC 3971, Mar. 2005, 53 pages.

Draves, R., et al., "Default Router Preferences and More-Specific Routes," Network Working Group, RFC 4191, Nov. 2005, 16 pages.

Fenner, B., et al., Internet Group Management Protocol (IGMP)/Multicast Listener Discovery (MLD)—Based Multicast Forwarding ("IGMP/MLD Proxying"), Network Working Group, RFC 4605, Aug. 2006, 13 pages.

Narten, T., et al., "Neighbor Discovery for IP version 6 (IPv6)," Network Working Group, RFC 4861, Sep. 2007, 98 pages.

Thomson, S., et al., "IPv6 Stateless Address Autoconfiguration," Network Working Group, RFC 4862, Sep. 2007, 31 pages.

Coltun, R., et al., "OSPF for IPv6," Network Working Group, RFC 5340, Jul. 2008, 95 pages.

Bao, C., et al., "IPv6 Addressing of IPv4/IPv6 Translators," Internet Engineering Task Force (IETF), RFC 6052, Oct. 2010, 19 pages.

Jeong, J., et al., "IPv6 Router Advertisement Options for DNS Configuration," Internet Engineering Task Force (IETF), RFC 6106, Nov. 2010, 20 pages.

Li, X., et al., "IP/ICMP Translation Algorithm," Internet Engineering Task Force (IETF), RFC 6145, Apr. 2011, 34 pages.

Arkko, J., et al., "Guidelines for Using IPv6 Transition Mechanisms During IPv6 Deployment," Internet Engineering Task Force (IETF), RFC 6180, May 2011, 21 pages.

Durand, A., et al., "Dual-Stack Lite Broadband Deployments Following IPv4 Exhaustion," Internet Engineering Task Force (IETF), RFC 6333, Aug. 2011, 33 pages.

"Information Technology—Telecommunications and Information Exchange Between Systems—Intermediate System to Intermediate System Intra-Domain Routing Information Exchange Protocol for Use in Conjunction with the Protocol for Providing the Connectionless-Mode Network Service (ISO 8473)," International Organization for Standardization, International Standard, ISO/IEC 10589, First Edition: Apr. 30, 1992, 155 pages.

Office Action dated Nov. 25, 2015, 15 pages, U.S. Appl. No. 13/866,832, filed on Apr. 19, 2013.

* cited by examiner

SYSTEM AND APPARATUS FOR ROUTER ADVERTISEMENT OPTIONS FOR CONFIGURING NETWORKS TO SUPPORT IPV6 TO IPV4 MULTICAST TRANSLATION

CROSS-REFERENCE TO RELATED APPLICATIONS

The present application claims priority to U.S. Provisional Patent Application 61/635,736, filed Apr. 19, 2012 by Behcet Sarikaya, and entitled "IPv6 RA Options for Translation Multicast Prefixes and Multiple Interface Next Hop Routes," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network elements (NE) may function as nodes in a network. Such nodes may be configured to communicate data between various points in the network. Networks may be interconnected to other networks to allow NEs to communicate on a global scale, for example via the Internet. Such interconnected networks and associated NEs may employ new technology, legacy technology, technologies designed for varying purposes, or combinations thereof. NEs positioned along network boundaries may be configured to convert messages crossing such boundaries in order to allow communications across varied network architectures to occur in a manner that appears seamless to end users. NEs may require information to perform such conversions. The nature of the information and the manner of obtaining the information may vary depending on the technologies employed by the various NEs and networks.

SUMMARY

In one embodiment, the disclosure includes a NE comprising a processor configured to cause the NE to act as a default router for an Internet Group Management Protocol (IGMP) to Multicast Listener Discovery (MLD) translation entity; and configure the IGMP to MLD translation entity with a multicast translation prefix by including the multicast translation prefix in a router advertisement (RA) message sent to the IGMP to MLD translation entity.

In another embodiment, the disclosure includes a method comprising configuring an IGMP to MLD translation entity by transmitting a RA message to the IGMP to MLD translation entity, wherein the RA message comprises at least one multicast translation prefix.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some unicast IPv4 to IPv6 transition technologies, IPv4 to IPv6 translation may be employed such as NAT64, MAP Translation mode (MAP-T) and/or Encapsulation mode (MAP-E), and/or IPv4 Residual Deployment via IPv6—a Stateless Solution (4rd). Translation multicast technologies may complement such unicast solutions for multicast IPv4 to IPv6 transition.

Disclosed herein is a system and/or method to extend RA related protocols to configure system parameters. An IPv6 host may wish to receive a multicast data stream from an IPv4 source. An IGMP to MLD translation entity may be employed to covert packets between IPv6 and IPv4 networks in order to allow the host to join an associated multicast tree and receive an associated multicast data flow. The IGMP to MLD translation entity may receive multicast prefixes from a default router in a RA message. The multicast prefixes may allow the IGMP to MLD translation entity to complete such translations. The multicast prefixes in the RA message may comprise an ASM multicast prefix for IPv6 to IPv4 systems (ASM_MPREFIX64), a SSM multicast prefix for IPv6 to IPv4 systems (SSM_MPREFIX64), and/or a unicast prefix for IPv6 to IPv4 systems (U_PREFIX64). ASM_MPREFIX64 and SSM_MPREFIX64 may be discussed in Internet Engineering Task Force (IETF) documents draft-ietf-mboned-64-multicast-address-format-04 and request for comment (RFC) 3306 which are incorporated by reference as if reproduced in their entirety. The inclusion of such prefixes in an RA message may be discussed in IETF document draft-sarikaya-softwire-6man-raoptions4mcast-02, which is also incorporated by reference as if reproduced in its entirety.

Figure 1:
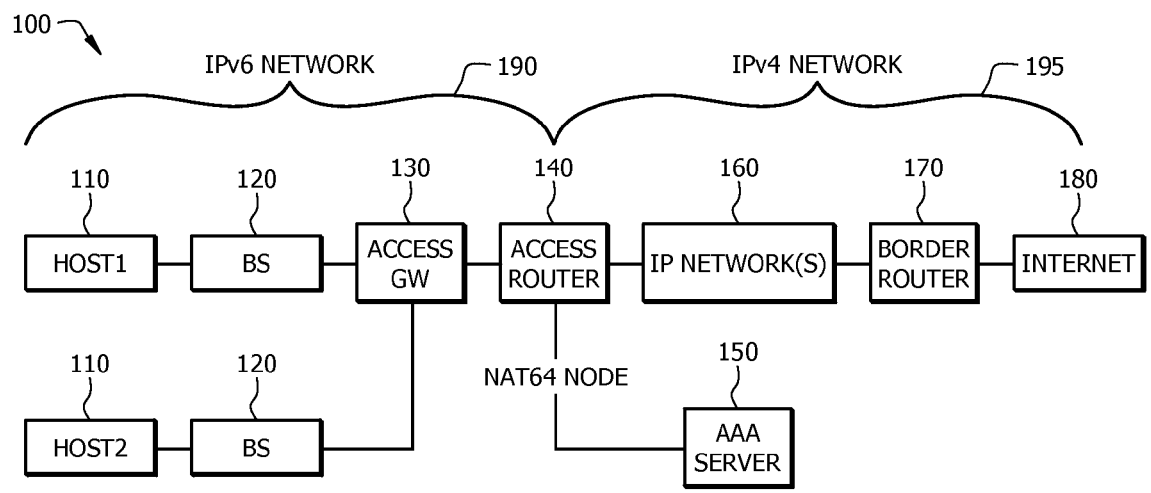
FIG. 1 is a schematic diagram of an embodiment of a Network Address Translation (NAT) Internet Protocol (IP) version six (v6) to IP version four (v4) (NAT64) network architecture.

FIG. 1 is a schematic diagram of an embodiment of a NAT64 network architecture 100. Network 100 may comprise an IPv6 network 190 (e.g. an access network) and an IPv4 network 195 (e.g. a core network). The IPv6 network 190 may comprise a plurality of hosts 110, which may be connected to the network 100 via base stations 120 and an access gateway 130. The IPv4 network 195 may be positioned in a datacenter and may comprise an authentication, authorization and accounting (AAA) server 150, various IP network(s) 160, and a border router 170 positioned between the IPv4 network 195 and the Internet 180. The IPv4 network 195 may further comprise a NAT64 node 140 (e.g. implemented by an access router), which may be positioned at the edge of the IPv6 network 190 and the IPv4 network 195. The NAT64 node 140 may translate communications from IPv6 to IPv4 and vice versa as needed to allow such communications to pass between networks 190 and 195. In network 100, the IPv6 hosts 110 may wish to receive a multicast flow from source(s) that may be positioned in IPv4 network 195 and/or from source(s) positioned across the Internet 180 via the IPv4 network. The host 110 may transmit a router solicitation to NAT64 node 140, which may act as a default router for host 110. The NAT64 node 140 may respond with an RA message comprising multicast translation prefix information and/or related multicast group information. The host 110 may act as an IGMP/MLD translation entity, use the multicast translation prefix information to translate a native MLD membership report message into an IGMP membership report message that may be interpreted by the IPv4 network 195, and transmit the IGMP membership report message toward the source.

The IPv6 network 190 may comprise the host(s) 110, the base station(s) 120 and the access gateway 130. The host 110 may be any IPv6 host interested in receiving a multicast flow. For example, the host 110 may comprise a smart phone, tablet personal computer (PC), laptop, or other computer that wishes to receive a television (TV) channel, radio channel, or other multicast data. The host 110 may connect to the IPv6 network 190 via a base station 120, which may be a stationary wireless transceiver configured to wirelessly communicate with the host 110. The base station 120 may connect to access gateway 130 via a wired connection. The access gateway 130 may be any node/NE configured to provide the host 110 with access to the IPv4 network 195. The access gateway 130 may receive data (e.g. multicast data) from the IPv4 network 195, transmit the data to the base station 120 for wireless transmission to the host 110 Likewise, the host 110 may wirelessly transmit data to the base station 120, which may communicate the data to the access gateway 130 for transmission to the IPv4 network 195.

The host1 may be interested in receiving multicast data. Multicast data may be source specific, may be transmitted by specific source(s) to a group, and may be noted in the form (S,G) where S denotes the IP address of the source(s) and G denotes a group address. Multicast data may also be any source data, may be translated by any source node(s) to a group, and may be denoted in the form (G) where G denotes a group address. In order to receive multicast data, the host 110 may transmit a membership report upstream toward the source and/or sources. The membership report may be an IGMP membership report which may be native technology for IPv4 or an MLD membership report which may be native technology for IPv6. An upstream node may receive the membership report, join an associated multicast tree (e.g. via a Protocol Independent Multicast (PIM) join message, a SSM join message, an ASM join message, etc.), and transmit multicast data received from the multicast tree downstream toward the host 110. As host 110 may be an IPv6 host, host 110 may natively employ MLD reports for obtaining access to multicast flows. Upon determining that the source(s) associated with the multicast flow are positioned in an IPv4 network or are communicating via an IPv4 network, the host 110 may act as an IGMP/MLD translation entity and may translate any MLD messages to IGMP format. Also, the host 110 may translate received IPv4 multicast data into IPv6 multicast data. The IGMP message may be transmitted across the IPv6 network 190. As such, the host 110 may be required to translate IPv4 addresses into IPv6 format so that the IPv6 network 190 nodes may perform associated routing functions for the IGMP message. For example, an IPv4 address may be encapsulated in an IPv6 address by adding an IPv6 prefix to the IPv4 address. Such added prefixes may be assigned by a default router (e.g. NAT64 node 140) and may be used to route the data to the default router for transmission toward the multicast source(s). The prefixes may also be used to determine the nature of the multicast group and/or source. For example, the host 110 may act as a translation entity, may encapsulate an IPv4 ASM group address using an IPv6 ASM prefix (e.g. where the resulting IPv6 address acts as G of (G)), encapsulate an IPv4 SSM group address using an IPv6 SSM prefix (e.g. where the resulting IPv6 address acts as G of (S,G)), and/or encapsulate an IPv4 unicast source address using an IPv6 unicast prefix (e.g. where the resulting IPv6 address acts as S of (S,G)).

IPv4 network 195 may, for example, comprise an internet service provider (ISP) network. The IPv4 network may be positioned in a data center and may comprise a NAT64 node 140 positioned at the edge of the IPv6 network 190, a AAA server 150, IP networks 160, and a border router 170 positioned at the edge of the Internet 180. The NAT64 node 140 may translate packets coming from the IPv6 network 190 into a format readable by components in the IPv4 network 195. For example, the NAT64 node 140 may remove IPv6 prefixes from embedded IPv4 in IPv6 addresses in IPv6 packets and forward such packets across the IPv4 network using the IPv4 addresses. The NAT64 node 140 may also translate IPv4 packets received from upstream nodes (e.g. in IPv4 network 195 and/or over the Internet 180) into IPv6 packets for transmission downstream to the IPv6 network 190. The AAA server 150 may be any node that performs authentication, authorization, and/or accounting for IPv4 network 195. For example, the AAA server 150 may authenticate and/or authorize host 110 to access IPv4 network 195 and may perform associated accounting functions to allow the host 110 and/or operators of host 110 to be charged accordingly for network use. IP networks 160 may be the core network for an ISP and may comprise servers, switches, etc. configured to perform tasks that may be required of an ISP or other entity, such as data storage, transmission, reception, and/or processing. Border router 170 may be any device configured to provide access and/or translation for communications received from and/or sent across the Internet 180.

The NAT64 node 140 may act as a default router for host 110. As such, the NAT64 node 140 may receive a Router Solicitation (RS) from host 110 requesting information about multicast groups. The NAT64 node 140 may respond to an RS with an RA. The RA may comprise appropriate ASM prefixes, SSM prefixes, and/or multicast source unicast prefixes. As such, the NAT64 node 140, acting as a default router, may configure the IPv6 host 110, acting as an IGMP/MLD translation entity, with multicast translation prefixes for communication with IPv4 multicast tree nodes. The RA may be transmitted toward the host 110 and/or flooded across the IPv6 network 190, for example via an Interior Gateway Protocol (IGP) such as Open Shortest Path First (OSPF), Intermediate System to Intermediate System (IS-IS), etc. by the access gateway 130. The multicast prefixes may be associated with the NAT64 node 140 on the IPv6 network 190 side so that packets using such multicast prefixes as a destination address may be routed to the NAT64 node 140. Once the host 110 is configured, the host 110 may transmit an IGMP membership report to the NAT64 node 140 using the appropriate prefixes. The NAT64 node 140 may convert such reports to IPv4 format and forward them upstream toward a node configured to join the appropriate multicast tree. In another embodiment, the NAT64 node 140 may process the IGMP membership report and may join the multicast tree (e.g. via an ASM join message, SSM join message, PIM join message, etc.) The NAT64 node 140 may also receive multicast flow data destined for the host 110 (e.g. in IPv4 format) and may translate such data for transmission across IPv6 network 190, for example by embedding IPv4 addresses in IPv6 addresses.

As discussed above, In IPv4 to IPv6 translation multicast, specific IPv6 addresses may be used in which an IPv4 address may be embedded in an IPv6 address. Some of the addresses may be multicast IPv6 addresses and some may be unicast addresses. The multicast and the unicast addresses may be generated from corresponding multicast and unicast prefixes. The multicast prefixes may be provisioned by and/or for the host(s) that are involved in translation (e.g. host 110).

A host 110 wishing to join a SSM group may send an IGMP Membership Report message and include the SSM group address in a Multicast Address field of a Group Record field in IPv4. The multicast group address may be a multicast group address in a SSM range. In the IPv4 to IPv6 transition scenarios that may be based on translation multicast, an IGMP Membership Report message may be translated into a MLD Membership Report message, for example at the IGMP/MLD proxy entity (e.g. IGMP/MLD Translation entity). A SSM group may be identified with a group and source address in (S,G) form. The source address may be specified in a Source Address field of a Group Record field in an IGMP Membership Report message. More than one source address may be associated with a Multicast Address.

The IGMP to MLD translation entity (e.g. host 110) may be configured with an IPv6 multicast group prefix that is in an SSM range. Multicast prefixes (MPREFIX64) for IPv4-embedded IPv6 multicast address may be based on an IPv4 multicast address of types: ASM_MPREFIX64 for ASM and SSM_MPREFIX64 for SSM. The IGMP to MLD translation entity may be configured with SSM_MPREFIX64 by its default router (e.g. NAT64 node 140), for example if the default router includes in its RAs a Multicast SSM Translation Prefix option. SSM_MPREFIX64 may be of type ff3x:0:8000/96. x may stand for a scope bits, and Prefix length may be set to 96. The IGMP to MLD translation entity (e.g. host 110) may also be configured with ASM_MPREFIX64 by its default router if the default router includes in its Router Advertisements a Multicast ASM Translation Prefix option. ASM_MPREFIX64 may be of type ffxx:8000::/20. The first x may stand for flags, the second x may stand for a scope bits, a Prefix length may be set to 20.

SSM groups may comprise one or more sources, S in (S,G). The source address may be specified by the joining host in an IGMP Membership Report message's Source Address field of Group Record. An IPv4 source address in an IGMP Membership Report message may be translated into an IPv6 source address in the translated MLD message. An IGMP to MLD translation entity (e.g. host 110) may be configured with U_PREFIX64 by its default router (e.g. NAT64 node 140) if the default router includes in its RAs a Multicast Translation Unicast Prefix option. U_PREFIX64 may be assigned to 64:ff9b::/96 which may be known as a well-known prefix or to an operator specific value. Prefix length may be set to 96. IPv4-Embedded IPv6 Unicast Addresses may be formed using the rules defined in IETF document RFC 6052, which is incorporated by reference.

U_PREFIX64 may also be used in translating IPv4 multicast data packets from SSM sources, S of (S,G) into IPv6 multicast data packets. In this case the translation entity may be connected to the IPv4 network 195 at the border of an IPv6 network (e.g. Border Router 170 may be the translation entity). In this example, the Border Router 170 may be configured with U_PREFIX64 by its default router (e.g. an upstream node between border router 170 and the Internet 180). The default router may include in its RAs a Multicast Translation Unicast Prefix option.

Multicast translation prefixes may be configured using Dynamic Host Configuration Protocol (DHCP) in some networks. However, DHCP version six (DHCPv6) may not be used in other networks such as in 3rd Generation Partnership Project (3GPP) networks. The RA based solution discussed herein may be used when DHCP is not configured and/or used. Also it may be advantageous for some operators to use the RA based solution discussed herein for other reasons.

In NAT64 (e.g. network 100), the IGMP to MLD translation entity may be host 110. The default router of the host 110 may be configured to send SSM_PREFIX64 and ASM_PREFIX64 in its RAs. In some configurations NAT64 box 140 may be the default router, and then NAT64 box 140 may be configured to send the RAs. This may include the case where the NAT64 box 140 is located in an access router, such as the Broadband Network Gateway (BNG) in broadband networks and/or a Packet Data Network Gateway (PDN Gateway) in an Long Term Evolution (LTE) network where DHCP may not be used. The host 110 may receive the RA's Multicast ASM Translation Prefix option and Multicast SSM Translation Prefix option and may use the prefix (SSM_PREFIX64 and/or ASM_PREFIX64) in translating IGMP messages to MLD messages and vice versa.

In NAT64, a Border Router which may receive IPv4 multicast data may act as a NAT64 box (e.g. NAT64 node 140). The default router (e.g. a node in IP networks 160) of NAT64 box 140 may be configured to send a Multicast Translation Unicast Prefix option in its router advertisements. This may configure NAT64 box 140 with U_PREFIX64. NAT64 box 140 may use the U_PREFIX64 to translate IPv4 multicast data coming from SSM sources to IPv6 multicast data. In case SSM is supported, the default router (e.g. NAT64 node 140) for the hosts 110 may be configured to send a Multicast Translation Unicast Prefix option in its RAs. The hosts 110 may use U_PREFIX64 in translating IGMP messages (e.g. IGMP version three (IGMPv3)) to MLD messages (e.g. MLD version two (MLDv2)) and in translating IPv6 multicast data to IPv4 multicast data.

Figure 2:
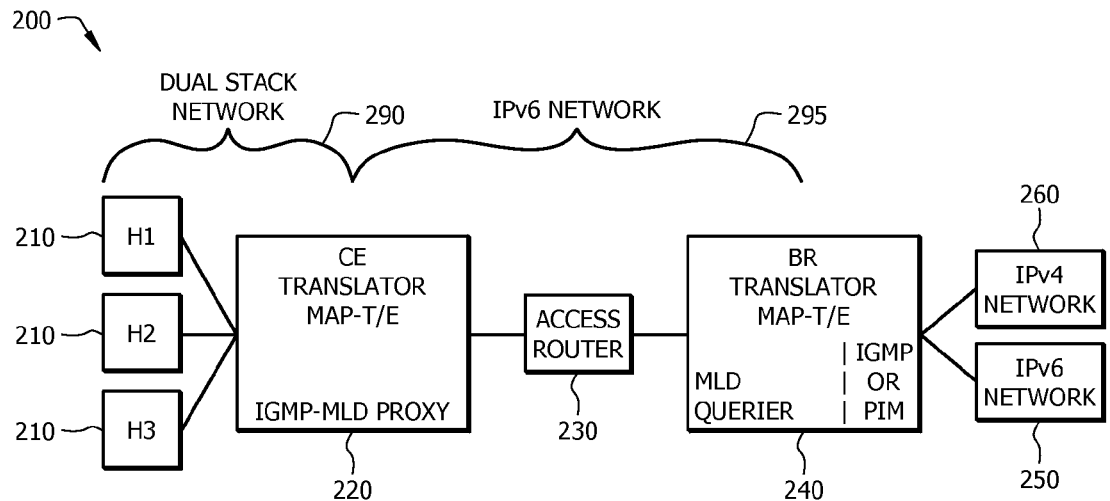
FIG. 2 is a schematic diagram of an embodiment of a Mapping of Address and Port (MAP) network architecture.

FIG. 2 is a schematic diagram of an embodiment of a Mapping of Address and Port (MAP) network architecture 200. Network 200 may employ MAP-T and/or MAP-E. Network 200 may comprise a dual stack network 290, which may comprise hosts 210 and/or other nodes which may be configured to communicate in both IPv6 and IPv4. Dual stack network 290 may be coupled to an IPv6 network 295, which may comprise a Customer Edge (CE) 220, an access router 230, and a border router 240. The IPv6 network 295 may be coupled to another IPv6 network 250 and an IPv4 network 260. Hosts 210 may desire to receive multicast flows from a multicast source positioned in IPv4 network 260. Network 200 may operate in a similar manner to network 100. However, the CE 220 may comprise an IGMP-MLD proxy that may be used to proxy the hosts 210. As such, CE 220 may act as an IGMP/MLD translation entity on behalf of the hosts 210. The access router 230 and/or the border router 240 may act as a default router for CE 220. As such, CE 220 may transmit a router solicitation to access router 230 and/or the border router 240 on behalf hosts 210. The default router (e.g. access router 230 and/or the border router 240) may respond with an RA with multicast translation prefixes, which may allow the CE 220 to perform IGMP-MLD translations and/or multicast address translations for packets transmitted across IPv6 network 295 toward source(s) positioned in IPv4 network 260. Also, BR 240 may receive appropriate multicast translation prefixes in an RA of the BR's 240 default router, which may be access router 230, CE 220 and/or a node positioned in IPv4 network 260 and/or IPv6 network 250.

Dual stack network 290 may comprise dual stack hosts 210, which may end user devices, customer servers, etc. Dual stack hosts 210 may be configured to communicate in both IPv4 and IPv6. Dual stack hosts 210 may connect to network 200 via a CE 220 device. A CE 220 may also be referred to as a residential gateway (RG) in the residential context (e.g. in a non-commercial case.) CE 220 may be configured to act as a dual stack device on the host 210 side and as an IPv6 device on the IPv6 network 295 side. CE 220 may proxy hosts 210 and encapsulate and/or translate messages from the hosts 210 into an IPv6 format to allow the IPv4 portion of the dual stack network 290 to communicate with the IPv6 network 295. CE 220 may also decapsulate and/or translate messages headed downstream toward the hosts 210 toward the IPv4 portion of the dual stack network 290. CE 220 may act as an IGMP-MLD translation entity on behalf of hosts 210, and may receive multicast translation prefixes and perform translations in a manner similar to hosts 110. CE 220 may receive IGMP membership reports from the IPv4 portion of hosts 210, translate such IGMP messages into MLD using the multicast translations prefixes, and forward the resulting MLD membership reports toward border router 240. CE 220 may receive the multicast translations prefixes from a default router (e.g. access router 230) as part of a router advertisement.

IPv6 network 295 may comprise border router 240, which may be similar to border router 170, but may act as a MAP-T and/or MAP-E device for IPv4 packets coming to the IPv6 network 295 from IPv4 network 260 and vice versa. Border router 240 may act as an MLD querier on the IPv6 network 295 interface and an IGMP and/or PIM querier on the upstream interfaces. The border router 240 may translate and/or decapsulate MLD membership report messages from the CE 220 for transmission toward the IPv4 source (e.g. in the IGMP querier case) and/or transmit a PIM join message to join a multicast tree associated with the MLD membership report (e.g. in the PIM querier case). The border router 240 may also employ multicast translation prefixes to perform appropriate translation and/or encapsulation functions. The border router 240 may receive the multicast translation prefixes from a default router, such as access node 230, CE 220, and/or other node(s) in IPv4 network 260 and/or IPv6 network 250, as part of an RA message. IPv6 network 295 may also comprise other network nodes configured to provide CE 220 and/or hosts 210 access to IPv6 network 295.

As discussed above, In MAP-T/E, the IGMP to MLD translation entity may be the CE 220. The default router of CE 220, (e.g. the access router 230) may be configured to send SSM_PREFIX64 and ASM_PREFIX64 in its router advertisements. The CE 120 may receive the RAs with Multicast ASM Translation Prefix option and Multicast SSM Translation Prefix option, and may use the prefix (SSM_PREFIX64 or ASM_PREFIX64) in translating IGMP messages to MLD messages and vice versa.

In MAP-T/E, the router which may receive IPv4 multicast data (e.g. from IPv4 network 260) may be the border router 240 box. A default router of the border router 240 box may be configured to send a Multicast Translation Unicast Prefix option in its router advertisements. Sending such RAs may configure the border router 240 with U_PREFIX64. The border router 240 may use the U_PREFIX64 to translate IPv4 multicast data coming from SSM sources into IPv6 multicast data.

In case SSM is supported, the default router for the CE 220 may be configured to send a Multicast Translation Unicast Prefix option in its RAs. The CE 220 may use U_PREFIX64 in translating IGMP messages (e.g. IGMPv3) to MLD messages (e.g. MLDv2) messages and in translating IPv6 multicast data to IPv4 multicast data.

Figure 3:
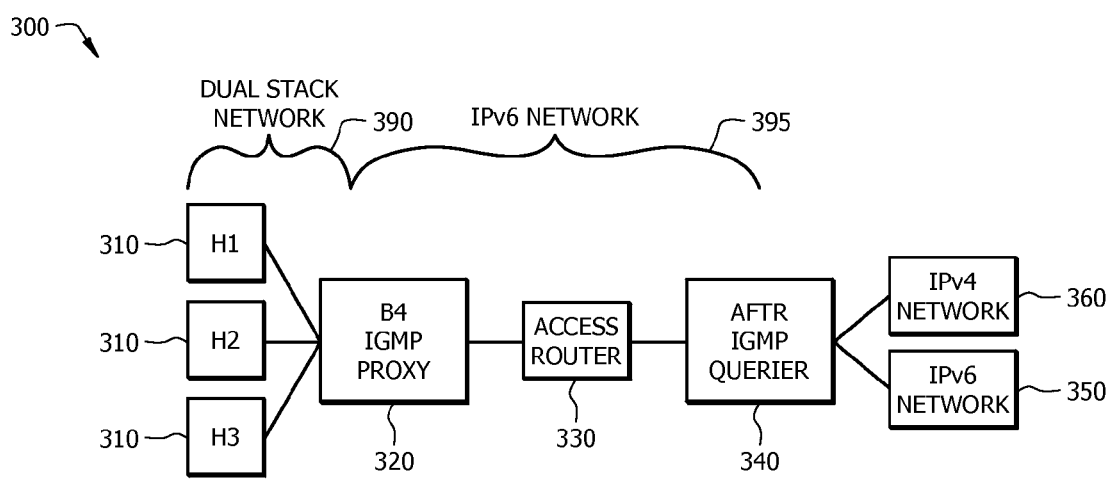
FIG. 3 is a schematic diagram of an embodiment of a Dual Stack (DS)-Lite network architecture.

FIG. 3 is a schematic diagram of an embodiment of a Dual Stack (DS)-Lite network architecture 300. Network 300 may comprise a dual stack network 390 that comprises dual stack hosts 310, which may be similar to dual stack network 290 and hosts 210, respectively. Network 300 may further comprise an IPv6 network 395, which may further comprise a Basic Bridging BroadBand (B4) device 320, an access router 330, which may be substantially similar to access router 230, and an Address Family Transition Router (AFTR) element 340. IPv6 network 395 may be coupled to dual stack network 390 via B4 device 320 and coupled to the IPv4 network 360 and IPv6 network 350 via the AFTR element 340. The IPv4 network 360 and IPv6 network 350 may be substantially similar to IPv4 network 260 and IPv6 network 250. B4 320 may act as a proxy for hosts 310 in a similar manner as CE 220 may act as a proxy for hosts 210. As such, B4 320 may send a RS message to B4's 320 default router (e.g. access router 330), receive multicast translation prefixes in an RA message, and perform IGMP-MLD translations as an IGMP-MLD translation entity. AFTR element 340 may also act as a translation entity for multicast flows received from IPv4 network 360 in a similar manner to border router 240. As such, AFTR element 340 may also receive multicast translation prefixes in an RA message from a default router (e.g. access router 330), and perform appropriate translations.

As discussed above, in DS-Lite 300, IPv6 hosts 310 may use native multicast over an IPv6 only network 395. IPv4 only hosts 310 may need multicast translation, which may be provided by the B4 element 320 and the AFTR element 340. IPv4 only hosts 310 may subscribe to IPv4 multicast groups using IGMP.

At the B4 320, an IPv4 group address (in ASM or SSM) may be translated into an IPv6 group address using ASM_MPREFIX64 and/or SSM_MPREFIX64. DHCP may not be used. The access router 330 may configure the multicast translation prefixes at the B4s using RAs as discussed herein. Multicast data in IPv6 network 395 may be translated into IPv4 multicast data at the B4 320. For SSM groups, U_PREFIX64 may be used to translate the source address. The access router 330 may configure the U_PREFIX64 prefix at the B4 320 and/or AFTR 340 using the RAs as discussed herein.

It should be noted that Neighbor Discovery may be subject to attacks that cause IP packets to flow to unexpected places. As such, neighbor discovery messages may be secured, for example by using Secure Neighbor Discovery (SEND) protocol.

Figure 4:
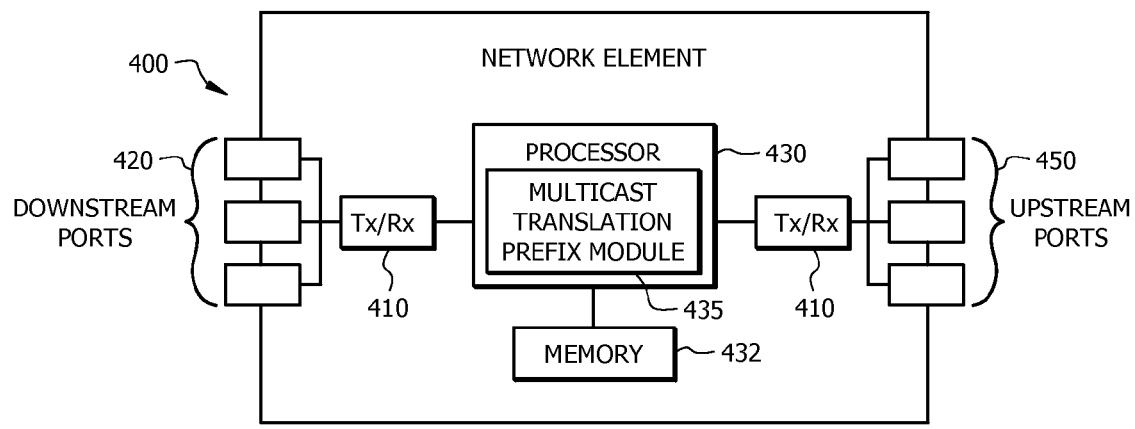
FIG. 4 is a schematic diagram of an embodiment of a NE within a default router.

FIG. 4 is a schematic diagram of an embodiment of a NE 400 within a default router, such as access router 140, border router 170, CE 220, border router 240, access router 230, B4 320, access router 330, and/or AFTR 340. In some embodiments NE 400 may also act as other node(s) in network 100, 200, and/or 300. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure, for example configuration of an IGMP-MLD translation entity (e.g. host 110, CE 220, border router 240, B4 320, and/or AFTR 340) with multicast prefix information, may be implemented in in a network apparatus or component such as an NE 400. For instance, the features/methods in the disclosure may be implemented using hardware, firmware, and/or software installed to run on hardware. The NE 400 may be any device that transports frames through a network, e.g., a switch, router, bridge, server, a client, etc. As shown in FIG. 4, the NE 400 may comprise transceivers (Tx/Rx) 410, which may be transmitters, receivers, or combinations thereof. A Tx/Rx 410 may be coupled to plurality of downstream ports 420 for transmitting and/or receiving frames from other nodes and a Tx/Rx 410 coupled to plurality of upstream ports 450 for transmitting and/or receiving frames from other nodes, respectively. A processor 430 may be coupled to the Tx/Rxs 410 to process the frames and/or determine which nodes to send frames to. The processor 430 may comprise one or more multi-core processors and/or memory devices 432, which may function as data stores, buffers, etc. Processor 430 may be implemented as a general processor or may be part of one or more Application-Specific Integrated Circuits (ASICs) and/or Digital Signal Processors (DSPs). Processor 430 may also comprise a multicast translation prefix module 435, which may receive a router solicitation from a IGMP/MLD translation entity, obtain SSM translation prefixes, ASM translation prefixes, and/or multicast unicast prefixes, encode at least one of the prefixes in an RA, and transmit the RA with the multicast prefix(es) to the translation entity. In the alternative, the multicast translation prefix module 435 may be implemented as instructions stored in memory 432, which may be executed by processor 430. The downstream ports 420 and/or upstream ports 450 may contain electrical and/or optical transmitting and/or receiving components. NE 400 may or may not be a routing component that makes routing decisions.

It is understood that by programming and/or loading executable instructions onto the NE 400, at least one of the processor 430, multicast translation prefix module 435, downstream ports 420, Tx/Rxs 410, memory 432, and/or upstream ports 450 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
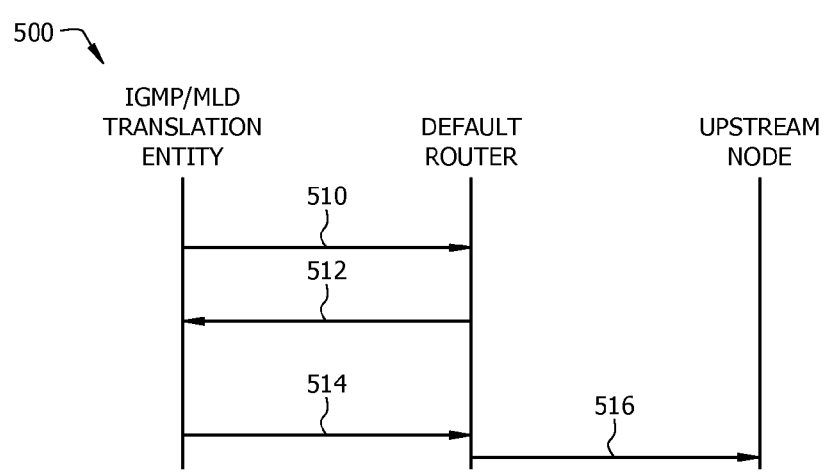
FIG. 5 is a protocol diagram of an embodiment of a method of configuring an IGMP to MLD translation entity.

FIG. 5 is a protocol diagram of an embodiment of a method 500 of configuring an IGMP to MLD translation entity. At step 510, an IGMP/MLD translation enity, such as host 110, CE 220, border router 240, B4 320, and/or AFTR 340, may transmit a RS to a default router such as access router 140, border router 170, CE 220, border router 240, access router 330, B4 320, access router 330, and/or AFTR 340. The RS of step 510 may be sent to obtain data associated with a multicast group (e.g. ASM and/or SSM) from which the IGMP to MLD translation entity is interested in receiving multicast data and/or flow(s). At step 512, the default router may obtain an SSM prefix, an ASM prefix, and/or a unicast prefix for use in multicast translation and transmits the prefix(es) to the IGMP/MLD translation entity in a RA. At step 514, the IGMP/MLD translation entity may create and/or translate an IGMP membership report to an MLD membership report and/or translate an associated IPv4 source and/or group address of a multicast message to an IPv6 source and/or group address, and may transmit the multicast message toward a multicast tree via the default router. At step 516, the default router may forward the multicast message toward the multicast tree, translate the message to another protocol, and/or translate the multicast address(es) from IPv4 to IPv6 (or vice versa) as appropriate for an associated embodiment.

Figure 6:
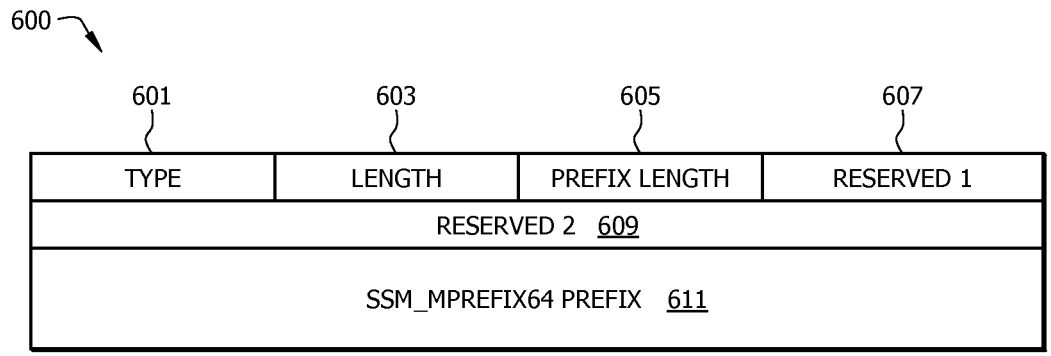
FIG. 6 is a schematic diagram of an embodiment of a Multicast Source Specific Multicast (SSM) Translation Prefix option encoding.

FIG. 6 is a schematic diagram of an embodiment of a Multicast SSM Translation Prefix option 600 encoding, which may be known as an SSM_PREFIX64 option. The Multicast SSM Translation Prefix option 600 may be sent by a default router (e.g. access router 140, border router 170, CE 220, border router 240, access router 230, B4 320, access router 330, and/or AFTR 340) as part of an RA message as defined in IETF document Request For Comments (RFC) 4861, which is incorporated by reference. The Multicast SSM Translation Prefix option 600 may comprise a multicast translation prefix. The Multicast SSM Translation Prefix option 600 may comprise a Type field 601, which may be eight bits in length, may extend from the zero bit position to the seventh bit position, and may be set to a value to indicate that the option is a Multicast SSM Translation Prefix option 600. The Multicast SSM Translation Prefix option 600 may further comprise a Length field 603, which may be eight bits in length, may extend from the eighth bit position to the fifteenth bit position, and may be set to a value to indicate the length of the Multicast SSM Translation Prefix option 600 (e.g. including the Type 601 and Length 603 fields) in units of eight octets. For example, the length for an IPv6 address may be a value of three. The Multicast SSM Translation Prefix option 600 may further comprise a Prefix Length field 605, which may be eight bits in length, may extend from the sixteenth bit position to the twenty third bit position, may comprise an eight bit unsigned integer, and may be set to a value to indicate a number of leading bits in the SSM_MPREFIX64 Prefix field 611 that may comprise a prefix (e.g. bits that may be valid). For example, the values of the Prefix field 615 may range from about zero to about 128. The Multicast SSM Translation Prefix option 600 may further comprise a Reserved field 607, which may be eight bits in length, may extend from the twenty fourth bit position to the thirty first bit position, may be reserved for other purposes, and may be initialized to a value of zero by the sender and ignored by the receiver. The Multicast SSM Translation Prefix option 600 may further comprise a Reserved2 field 609, which may be thirty two bits in length, may extend from the zero bit position to the thirty first bit position, may be reserved for other purposes, and may be initialized to a value of zero by the sender and ignored by the receiver. The Multicast SSM Translation Prefix option 600 may further comprise a SSM_MPREFIX64 Prefix field 611, which may comprise an prefix of type SSM (e.g. a SSM_MPREFIX64 prefix), for use in IGMP/MLD and/or IPv4/IPv6 multicast translation. The prefix may belong to a range of prefix numbers designated for SSM and may comprise a value similar to ff3x:0:8000/33. The prefix may be used for embedding IPv4 SSM range multicast addresses to create IPv6 addresses. The bits of the SSM_MPREFIX64 Prefix field 611 that do not comprise the SSM prefix (e.g. bits that may not be valid) may be reserved, initialized to a value of about zero by the sender, and may be ignored by the receiver.

Figure 7:
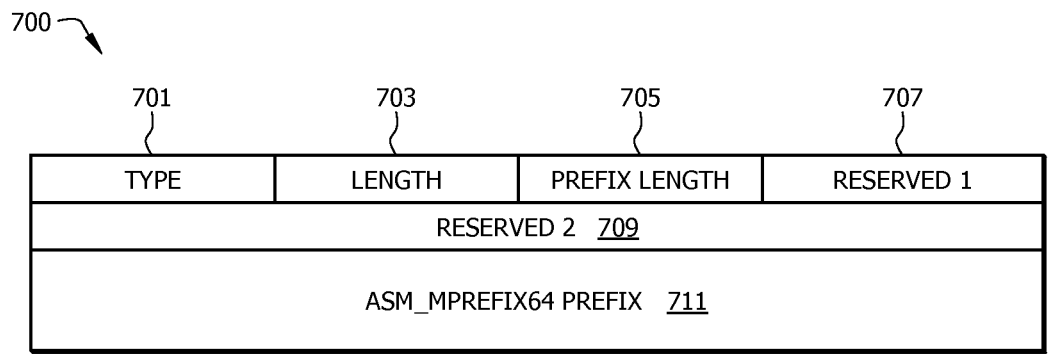
FIG. 7 is a schematic diagram of an embodiment of a Multicast Any-Source Multicast (ASM) Translation Prefix option encoding.

FIG. 7 is a schematic diagram of an embodiment of a Multicast ASM Translation Prefix option 700 encoding, which may be known as an ASM_MPREFIX64 option. The Multicast ASM Translation Prefix option 700 may be sent by a default router (e.g. access router 140, border router 170, CE 220, border router 240, access router 230, B4 320, access router 330, and/or AFTR 340) as part of an RA message, as defined in IETF document RFC 4861, and may comprise a multicast translation prefix. The Multicast ASM Translation Prefix option 700 may comprise a Type field 701, a Length field 703, a Prefix Length field 705, a Reserved field 707, and a Reserved2 field 709, which may be substantially similar to Type field 601, Length field 603, Prefix Length field 605, Reserved field 607, and Reserved2 field 609, respectively. However, the Type field 701 may be set to a value to indicate that the option is a Multicast ASM Translation Prefix option 700. The Multicast ASM Translation Prefix option 700 may further comprise a ASM_MPREFIX64 Prefix field 711, which may be similar to SSM_MPREFIX64 Prefix field 611, but may comprise a prefix of type ASM. It is a prefix may belong to a range of prefixes designated for ASM and may comprise a value similar to ffxx:8000/17. The prefix may be used for embedding IPv4 ASM range multicast addresses to create IPv6 addresses.

Figure 8:
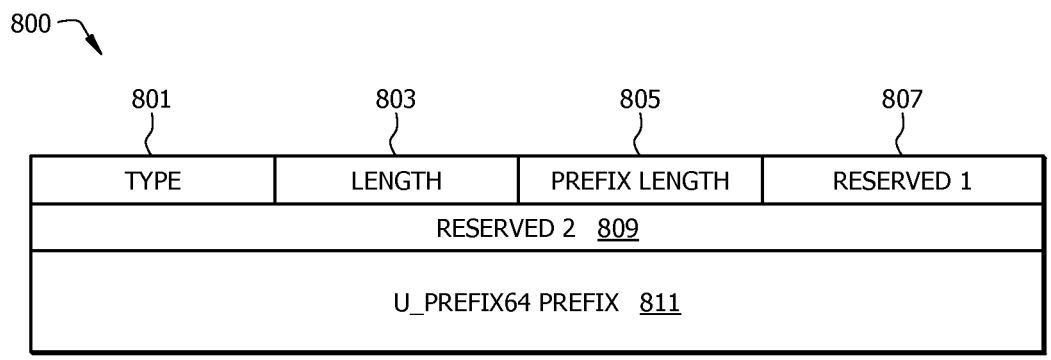
FIG. 8 is a schematic diagram of an embodiment of a Multicast Translation Unicast Prefix option encoding.

FIG. 8 is a schematic diagram of an embodiment of a Multicast Translation Unicast Prefix option 800 encoding, which may be known as an U_PREFIX64 option. The Multicast Translation Unicast Prefix option 800 may be sent by a default router (e.g. access router 140, border router 170, CE 220, border router 240, access router 230, B4 320, access router 330, and/or AFTR 340) as part of an RA message, as defined in IETF document RFC 4861, and may comprise a multicast translation prefix. The Multicast Translation Unicast Prefix option 800 may comprise a Type field 801, a Length field 803, a Prefix Length field 805, a Reserved field 807, and a Reserved2 field 809, which may be substantially similar to Type field 601, Length field 603, Prefix Length field 605, Reserved field 607, and Reserved2 field 609, respectively. However, the Type field 801 may be set to a value to indicate that the option is a Multicast Translation Unicast Prefix option 800. The Multicast Translation Unicast Prefix option 800 may further comprise a U_PREFIX64 Prefix field 811, which may be similar to SSM_MPREFIX64 Prefix field 611 and/or ASM_MPREFIX64 Prefix field 711, but may comprise a prefix of type unicast (e.g. a prefix associated with a SSM multicast source). The unicast prefix may be used to translate IPv4 source addresses into IPv6 source address or vice versa for SSM sources. The U_PREFIX_64 may be set to a well-known prefix such as 64:ff9b::/96 and/or set to a network specific prefix with mapping rules for an IPv4 to IPv6 address and/or vice versa.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
    a receiver configured to receive a router solicitation (RS) from an Internet Group Management Protocol (IGMP) to Multicast Listener Discovery (MLD) translation entity; and
    a processor coupled to the receiver and configured to:
        cause the NE to act as a default router for the IGMP to MLD translation entity; and
        configure the IGMP to MLD translation entity with a multicast translation prefix by including the multicast prefix in a router advertisement (RA) message sent to the IGMP to MLD translation entity,
    wherein the multicast translation prefix comprises a Source Specific Multicast (SSM) multicast prefix for IPv6 to IPv4 (SSM_MPREFIX64) prefix, an Any Source Multicast (ASM) multicast prefix for IPv6 to IPv4 (ASM_MPREFIX64) prefix, or a Unicast Prefix for IPv6 to IPv4 (U_PREFIX64) prefix selected based on the RS, and
    wherein the multicast translation prefix is encoded in the RA message in a Multicast SSM Translation Prefix option, comprising:
        a Type field that indicates an option is a Multicast SSM Translation Prefix option;
        a Length field that indicates a length of the Multicast SSM Translation Prefix option;
        a SSM_MPREFIX64 Prefix field that comprises the SSM_MPREFIX64 prefix; and
        a Prefix Length field that indicates a number of leading bits in the SSM_MPREFIX64 Prefix field that comprise the multicast translation prefix.

2. The NE of claim 1, wherein the NE acts as a default router for an Internet Protocol version six (IPv6) host.

3. The NE of claim 2, wherein the processor is further configured to implement a network address translation IPv6 to Internet Protocol version four (IPv4) (NAT64) box for the IPv6 host.

4. The NE of claim 1, wherein the NE acts as a default router for a Customer Edge (CE) Mapping of Address and Port (MAP) device.

5. The NE of claim 1, wherein the NE acts as a default router for a Border Router (BR) Mapping of Address and Port (MAP) device.

6. The NE of claim 1, wherein the NE acts as a default router for a Basic Bridging BroadBand (B4) IGMP Proxy device.

7. A method comprising:
    receiving a router solicitation (RS) from an Internet Group Management Protocol (IGMP) to Multicast Listener Discovery (MLD) translation entity; and
    configuring the IGMP to MLD translation entity by transmitting a router advertisement (RA) message to the IGMP to MLD translation entity,
    wherein the RA message comprises at least one multicast translation prefix comprising a Source Specific Multicast (SSM) multicast prefix for IPv6 to IPv4 (SSM_MPREFIX64) prefix, an Any Source Multicast (ASM) multicast prefix for IPv6 to IPv4 (ASM_MPREFIX64) prefix, or a Unicast Prefix for IPv6 to IPv4 (U_PREFIX64) prefix selected based on the RS, and
    wherein the multicast translation prefix is encoded in the RA message in a Multicast SSM Translation Prefix option, comprising:
        a Type field that indicates an option is a Multicast SSM Translation Prefix option;
        a Length field that indicates a length of the Multicast SSM Translation Prefix option;
        a SSM_MPREFIX64 Prefix field that comprises the SSM_MPREFIX64 prefix; and
        a Prefix Length field that indicates a number of leading bits in the SSM_MPREFIX64 Prefix field that comprise the multicast translation prefix.

8. The method of claim 7, further comprising acting as a default router for the IGMP to MLD translation entity.

9. The method of claim 7, wherein configuring the IGMP to MLD translation entity comprises configuring the IGMP to MLD translation entity to translate ASM IGMP membership reports to ASM MLD membership reports with the ASM_MPREFIX64 prefix.

10. The method of claim 7, wherein configuring the IGMP to MLD translation entity comprises configuring the IGMP to MLD translation entity to translate SSM IGMP membership reports to ASM MLD membership reports with the SSM_MPREFIX64 prefix.

11. The method of claim 7, wherein configuring the IGMP to MLD translation entity comprises configuring the IGMP to MLD translation entity to translate IPv4 Source Specific Multicast (SSM) multicast data to IPv6 SSM multicast data with the U_PREFIX64 prefix.

12. A network element (NE) comprising:
    a receiver configured to receive a router solicitation (RS) from an Internet Group Management Protocol (IGMP) to Multicast Listener Discovery (MLD) translation entity; and
    a processor coupled to the receiver and configured to:
        cause the NE to act as a default router for the IGMP to MLD translation entity; and
        configure the IGMP to MLD translation entity with a multicast translation prefix by including the multicast translation prefix in a router advertisement (RA) message sent to the IGMP to MLD translation entity,
    wherein the multicast translation prefix comprises an Any Source Multicast (ASM) multicast prefix for IPv6 to IPv4 (ASM_MPREFIX64) prefix, and
    wherein the multicast translation prefix is encoded in the RA message in a Multicast Any-Source Multicast (ASM) Translation Prefix option, comprising:
        a Type field that indicates an option is a Multicast ASM Translation Prefix option;
        a Length field that indicates a length of the Multicast ASM Translation Prefix option;
        a ASM_MPREFIX64 Prefix field that comprises the ASM_MPREFIX64 prefix; and a Prefix Length field that indicates a number of leading bits in the ASM_MPREFIX64 Prefix field that comprise the multicast translation prefix.

13. A network element (NE) comprising:
a receiver configured to receive a router solicitation (RS) from an Internet Group Management Protocol (IGMP) to Multicast Listener Discovery (MLD) translation entity; and
a processor coupled to the receiver and configured to:
  cause the NE to act as a default router for the IGMP to MLD translation entity; and
  configure the IGMP to MED translation entity with a multicast translation prefix by including the multicast translation prefix in a router advertisement (RA) message sent to the IGMP to MLD translation entity,
wherein the multicast translation prefix comprises a Unicast Prefix for IPv6 to IPv4 (U_PREFIX64) prefix, and
wherein the multicast translation prefix is encoded in the RA message in a Multicast Translation Unicast Prefix option, comprising:
  a Type field that indicates an option is a Multicast Translation Unicast Prefix option;
  a Length field that indicates a length of the Multicast Translation Unicast Prefix option;
  a U_PREFIX64 Prefix field that comprises the U_PREFIX64 prefix; and
  a Prefix Length field that indicates a number of leading bits in the U_PREFIX64 Prefix field that comprise the multicast translation prefix.

\* \* \* \* \*

UNITED STATES PATENT AND TRADEMARK OFFICE
CERTIFICATE OF CORRECTION

PATENT NO. : 9,461,868 B2
APPLICATION NO. : 13/866867
DATED : October 4, 2016
INVENTOR(S) : Behcet Sarikaya It is certified that error appears in the above-identified patent and that said Letters Patent is hereby corrected as shown below:

In the Claims

Column 13, Lines 22-52, Claim 1, should read:
1. A network element (NE) comprising:
    a receiver configured to receive a router solicitation (RS) from an Internet Group Management Protocol (IGMP) to Multicast Listener Discovery (MLD) translation entity; and
    a processor coupled to the receiver and configured to:
        cause the NE to act as a default router for the IGMP to MLD translation entity;
        configure the IGMP to MLD translation entity with a multicast translation prefix by including the multicast translation prefix in a router advertisement (RA) message sent to the IGMP to MLD translation entity,
        wherein the multicast translation prefix comprises a Source Specific Multicast (SSM) multicast prefix for IPv6 to IPv4 (SSM_MPREFIX64) prefix, an Any Source Multicast (ASM) multicast prefix for IPv6 to IPv4 (ASM_MPREFIX64) prefix, or a Unicast Prefix for IPv6 to IPv4 (U_PREFIX64) prefix selected based on the RS,
and
        wherein the multicast translation prefix is encoded in the RA message in a Multicast SSM Translation Prefix option, comprising:
            a Type field that indicates an option is a Multicast SSM Translation Prefix option;
            a Length field that indicates a length of the Multicast SSM Translation Prefix option;
            a SSM_MPREFIX64 Prefix field that comprises the SSM_MPREFIX64 prefix; and
            a Prefix Length field that indicates a number of leading bits in the SSM_MPREFIX64 Prefix field that comprise the multicast translation prefix.

Signed and Sealed this
Fourteenth Day of February, 2017

Michelle K. Lee
*Director of the United States Patent and Trademark Office*